Patented Jan. 8, 1946

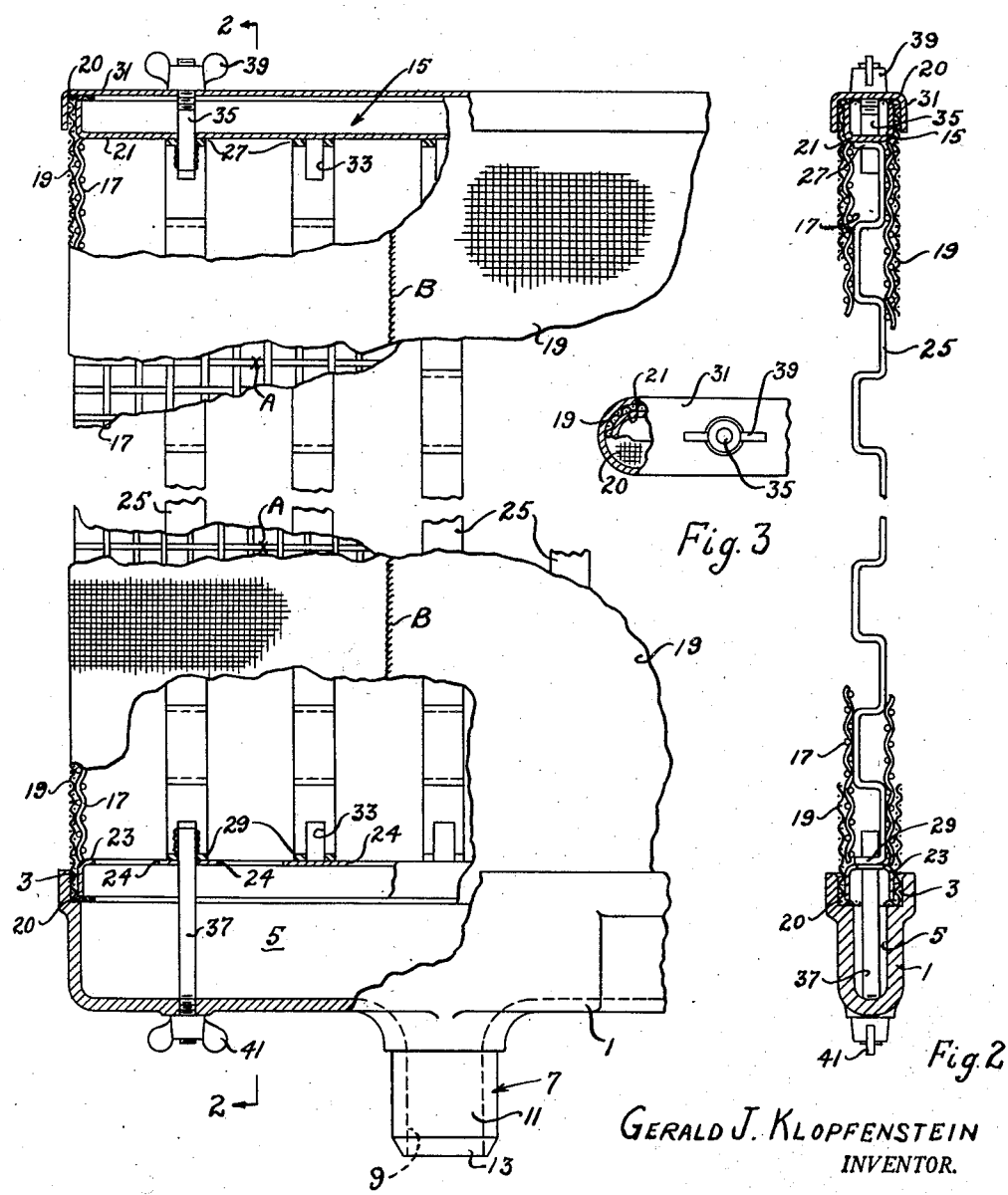

2,392,537

UNITED STATES PATENT OFFICE 2,392,537

SEPARABLE FILTER SCREEN

Gerald J. Klopfenstein, Fort Wayne, Ind., assignor to S. F. Bowser & Company, Incorporated, Fort Wayne, Ind., a corporation of Indiana Application July 14, 1943, Serial No. 494,890

5 Claims. (Cl. 210—195)

This invention relates to a filter leaf for use with filter aid material in filtering liquids. More particularly, it relates to a filter leaf in which the outer filter aid supporting screens may be joined with the screen supporting structure without the use of soldered joints.

One of the objects of the invention is to provide a filter leaf in which the filter screens are mounted by clamping them in place.

Another object of the invention is to provide a filter leaf having clamped joints surrounding the free edges of the filter screen which will prevent the by-passing of liquid through the joints.

Another object of the invention is to provide a filter leaf which will not unnecessarily impede the flow of filtrate.

Yet another object of the invention is to provide a filter leaf which can be very quickly and easily assembled.

Still another object of the invention is to provide a filter leaf in which the filter screens can be readily replaced when they become unserviceable.

These and other objects will become apparent from a study of this specification in connection with the drawing which is attached hereto and made a part thereof and in which:

Figure 1 is a side elevation of the filter leaf with parts broken away to show the construction.

Figure 2 is a sectional view of the apparatus of Figure 1 taken on the line 2—2 of that figure.

Figure 3 is a plan view of the leaf partially broken away.

Referring now to the drawing, the numeral 1 represents a bottom header which is flared at its upper, open end and formed with an internal recess 3, which runs all the way around the header, and with a channel 5, which runs from one side of the header to the other, but is closed at the ends.

The header is formed with a filtrate discharge nozzle 7 which has an opening 9 which communicates with the channel 5. The nozzle has a finished cylindrical surface 11 and a seat 13 which are received in a socket provided in the manifold of a pressure filter.

A frame 15 is provided to support the coarse inner screen 17 and the relatively fine outer or filter screen 19 against liquid pressure which is applied from the outside of the leaf to force liquid through the precoat on screen 19 and through the screen itself. The frame comprises an upper channel or end member 21 which opens upwardly, which is closed and rounded at the ends and which has relatively deep flanges. A lower channel or end member 23 of similar construction opens downwardly but is provided with elongated slots 24 in the web to permit the passage of filtrate downwardly to the channel 5 and nozzle 7.

A plurality of spacers 25 which are corrugated transversely and which have end flanges 27, 29 extend between the channel members, and the flanges 27 are fixed as by welding to the web of channel member 21 while the flanges 29 are fixed to the web of channel member 23. The depth of the corrugations of the spacers controls the spacing of the coarse screen 17 and this depth added to the thickness of both coarse screens approximates the outside width of the channel members so that the outer or filter screens will lie substantially parallel to the flanges of the channel members.

The filter screen 19 is made by welding together the ends of a flat screen as at B to form a cylinder which is then flattened and slipped over the frame and coarse screen. The screen extends beyond the flanges of the channel members at both ends of the frame and is then crimped inwardly over said members as at 20. This assembly is then forced down into the recess 3 as shown in Figures 1 and 2.

The inner, or coarse screen 17 is wrapped around the frame, in abutting relation with respect to the inner sides or surfaces of the channel or end members, the ends tack-welded as at A and tack-welded to the frame where necessary to hold it flush with the channel members.

A cap 31 which closely fits over the screen 19 is then forced into place.

Each end of each spacer is slotted at 33 and the webs of the channel members are perforated adjacent the slots. A stud 35 is mounted in the slot and perforation and is welded in place on both the spacer and the member 21. A similar but longer stud 37 is welded in place in the opposite end of the spacer and the member 29.

The studs 35 extend through the cap 31 and wing nuts 39 are screwed on the studs to hold the cap in place. The studs 37 extend through the lower head 1 and wing nuts 41 hold the lower head on the frame.

To assist in assembling the leaf, the inner edge of the cap and the recess 3 of the lower head may be chamfered.

It will be seen that the joints formed between the cap 31, screen 19 and channel member 21 and that between the lower head 1, screen 19 and channel member 23 are long and close and that in each case there is a line on which the screen is pinched between the flanges of the members and the parts which are drawn toward these flanges by the wing nuts. These two factors insure that there will be no passage to the interior of the filter leaf which will be large enough to pass the filter aid material even though these joints are not soldered. Thus all joints will be precoated with filter aid and no unfiltered liquid will pass to the interior of the filter leaf.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a filter leaf, the combination of a frame having an end member, said end member having an outwardly extending flange, a coarse screen wrapped around said frame and disposed substantially flush with said flange and abutting said end member, a filter screen surrounding said coarse screen and the flange of said end member, extending beyond said flange and crimped inwardly over said flange, a cap having a depending flange adapted to telescope over the end of said filter screen and to closely confine said filter screen between the flanges of the cap and the end member and means for holding said cap against the crimped over portion of said screen so as to compress said portion against the end of the flange of the end member.

2. In a filter leaf, the combination of a frame, comprising end members, relatively narrow, transversely corrugated spacers connected between said end members and disposed in spaced relation to each other, the depth of said corrugations being less than the width of said end members, a coarse screen wrapped around said frame and abutting said end members, the outer surface of said screen being disposed substantially flush with said end members, a filter screen disposed around said coarse screen and said end members, and means adapted to clamp said filter screen against said end members.

3. In a filter leaf, the combination of a frame comprising substantially parallel end members, each member having a cylindrical flange extending outwardly from the frame, a coarse screen wrapped about said frame between and abutting said end members, a fine screen formed as an endless band, fitted around and supported by said coarse screen, said fine screen extending beyond and being crimped over the flanges on the end members, a cap for each end member, each cap comprising a cylindrical flange, conforming to and adapted to receive the flange on the end member and the crimped over screen, and means for holding said caps in place.

4. In a filter leaf, the combination of a frame comprising end members and spacers disposed between and fixed to said end members, said end members each having a cylindrical, outwardly extending flange, a coarse screen wrapped about said spacers between said members, a fine screen formed as an endless band, fitted around said coarse screen and members, extending beyond and crimped over the flanges of said members, clamping means, fitted over said crimped screen and the flanges of said end members to clamp said screen against said flanges on said members to form a joint, an outlet for filtrate formed in one clamping means, and passages in one end member connecting the interior of the frame with said outlet.

5. In a filter leaf, the combination of a frame having an end member with a cylindrical, outwardly extending flange, a coarse screen wrapped about said frame, said screen being disposed in abutting relation with the end member and substantially flush with said flange, a fine screen formed as an endless band fitted around said coarse screen and extending beyond and crimped over the end of the flange of said member, a header having a relatively deep recess fitted over said crimped screen and the flange of said end member, clamping means acting on said header to clamp said screen against the flange of said member to form a joint, an outlet for filtrate in said header, and passages in said member connecting the interior of the frame with said outlet.

GERALD J. KLOPFENSTEIN.